US010588089B1

(12) United States Patent
Raghavan et al.

(10) Patent No.: US 10,588,089 B1
(45) Date of Patent: Mar. 10, 2020

(54) MITIGATION OF CALIBRATION ERRORS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Kobi Ravid, Closter, NJ (US); Yu-Chin Ou, San Diego, CA (US); Ozge Koymen, Princeton, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/138,880

(22) Filed: Sep. 21, 2018

(51) Int. Cl.
*H04B 7/04* (2017.01)
*H04W 52/24* (2009.01)

(52) U.S. Cl.
CPC ............ *H04W 52/245* (2013.01); *H04B 7/04* (2013.01)

(58) Field of Classification Search
CPC .............................. H04W 52/245; H04B 7/04
USPC ......................................................... 455/522
See application file for complete search history.

(56) References Cited

U.S. PATENT DOCUMENTS 6,140,976 A * 10/2000 Locke .................... H01Q 3/267
342/173
7,368,918 B2 * 5/2008 Henson ................ H02H 1/0015
324/536
7,515,719 B2 * 4/2009 Hooley ............... F41H 13/0081
381/18
7,681,453 B2 * 3/2010 Turner ............... G01N 21/1717
356/502
7,769,406 B2 * 8/2010 Lin ........................ H04W 24/00
370/241
7,970,428 B2 * 6/2011 Lin ........................ H04W 24/00
370/241

(Continued)

FOREIGN PATENT DOCUMENTS

WO   WO-2019099110 A1   5/2019

OTHER PUBLICATIONS

International Search Report and Written Opinion—PCT/US2019/0471450—ISA/EPO—dated Nov. 11, 2019.

*Primary Examiner* — Hai V Nguyen
(74) *Attorney, Agent, or Firm* — Qualcomm IP Dept.; James Hunt Yancey, Jr.

(57) ABSTRACT

Wireless communications systems and methods related to mitigation of calibration errors are provided. A base station (BS) transmits, via an antenna array including a plurality of antenna elements, a first communication signal using a first number of the plurality of antenna elements and a first transmission power level to a user equipment (UE). The BS receives from at least one UE, a measurement report based on the first communication signal. The BS transmitting a second communication signal using a second number of the plurality of antenna elements and a second transmission power level based on the one or more measurement reports. At least one of the first number of the plurality of antenna elements is different from the second number of the plurality of antenna elements, or the first transmission power level is different from the second transmission power level. Other aspects and features are also claimed and described.

30 Claims, 8 Drawing Sheets

(56) References Cited

U.S. PATENT DOCUMENTS

| | | | |
|---|---|---|---|
| 8,238,958 B2* | 8/2012 | Bourlas | H04L 1/0003 455/522 |
| 8,442,807 B2* | 5/2013 | Ramachandran | H04W 4/022 703/2 |
| 8,483,092 B2* | 7/2013 | de Sousa | H04W 16/18 370/255 |
| 8,634,384 B2* | 1/2014 | Marsh | H04L 1/0003 370/252 |
| 8,929,827 B2* | 1/2015 | Fix | H04W 24/02 370/252 |
| 8,938,252 B2* | 1/2015 | Alles | G01S 5/021 455/456.1 |
| 9,071,940 B2* | 6/2015 | Ramachandran | H04W 4/022 |
| 9,097,784 B2* | 8/2015 | Alles | G01S 5/021 |
| 9,166,849 B2* | 10/2015 | Chen | H04B 7/024 |
| 9,596,687 B1* | 3/2017 | Manchanda | H04W 72/046 |
| 9,680,233 B2* | 6/2017 | Fukuda | H01Q 23/00 |
| 9,686,729 B2* | 6/2017 | Zingler | H04W 36/0083 |
| 9,839,390 B2* | 12/2017 | Stein | A61B 5/4528 |
| 9,905,168 B1* | 2/2018 | Richards | G09G 3/3406 |
| 10,061,352 B1* | 8/2018 | Trail | G06F 3/167 |
| 10,261,542 B1* | 4/2019 | Trail | G06F 1/163 |
| 10,298,340 B2* | 5/2019 | Olgaard | H04B 17/318 |
| 2001/0031647 A1* | 10/2001 | Scherzer | H04B 7/0619 455/562.1 |
| 2001/0038674 A1* | 11/2001 | Trans | H04B 1/00 375/355 |
| 2002/0186167 A1* | 12/2002 | Anderson | G01S 5/02 342/465 |
| 2004/0151325 A1* | 8/2004 | Hooley | F41H 13/0081 381/18 |
| 2005/0024265 A1* | 2/2005 | Stilp | G01S 5/02 342/465 |
| 2005/0043053 A1* | 2/2005 | Lin | H04W 24/00 455/522 |
| 2006/0009235 A1* | 1/2006 | Sheynblat | G01S 5/0036 455/456.1 |
| 2006/0219014 A1* | 10/2006 | Turner | G01N 21/1717 73/643 |
| 2008/0298275 A1* | 12/2008 | De Sousa | H04W 16/18 370/255 |
| 2009/0117894 A1* | 5/2009 | Kogure | H04W 52/42 455/424 |
| 2009/0161880 A1* | 6/2009 | Hooley | F41H 13/0081 381/17 |
| 2009/0257357 A1* | 10/2009 | Marsh | H04L 1/0003 370/252 |
| 2009/0258665 A1* | 10/2009 | Bourlas | H04L 1/0003 455/522 |
| 2010/0197340 A1* | 8/2010 | Lin | H04W 24/00 455/522 |
| 2011/0295577 A1* | 12/2011 | Ramachandran | H04W 4/022 703/6 |
| 2012/0200458 A1 | 8/2012 | Jalali et al. | |
| 2013/0043992 A1* | 2/2013 | Mayer-Sommer | G08B 13/1427 340/539.11 |
| 2013/0226543 A1* | 8/2013 | Ramachandran | H04W 4/022 703/2 |
| 2013/0235962 A1* | 9/2013 | O'Keefe | H01Q 3/267 375/371 |
| 2013/0324149 A1* | 12/2013 | Fix | H04W 24/02 455/456.1 |
| 2013/0344831 A1* | 12/2013 | Yuan | H04W 24/04 455/226.2 |
| 2014/0016714 A1* | 1/2014 | Chen | H04B 7/024 375/260 |
| 2014/0059218 A1* | 2/2014 | Ganu | H04W 12/08 709/224 |
| 2014/0146863 A1* | 5/2014 | Seol | H04B 7/0456 375/224 |
| 2015/0003442 A1* | 1/2015 | Sun | H04W 16/02 370/350 |
| 2015/0111569 A1* | 4/2015 | Gupta | H04L 65/1069 455/426.1 |
| 2016/0197412 A1* | 7/2016 | Fukuda | H01Q 23/00 343/861 |
| 2016/0286456 A1* | 9/2016 | Zingler | H04W 36/0083 |
| 2017/0181102 A1* | 6/2017 | Bharadwaj | H04W 52/146 |
| 2017/0279507 A1 | 9/2017 | Kim et al. | |
| 2018/0006700 A1* | 1/2018 | Frenne | H04B 7/0417 |
| 2018/0227094 A1* | 8/2018 | Liu | H04L 5/0025 |
| 2018/0288601 A1* | 10/2018 | Song | H04W 64/003 |
| 2018/0351664 A1* | 12/2018 | Olgaard | H04B 17/21 |
| 2019/0028182 A1* | 1/2019 | Smyth | H04W 16/14 |
| 2019/0074876 A1* | 3/2019 | Kakishima | H04L 5/0007 |
| 2019/0079176 A1* | 3/2019 | Weissman | G01S 13/751 |
| 2019/0081675 A1* | 3/2019 | Jung | H04B 7/0617 |
| 2019/0081753 A1* | 3/2019 | Jung | H04B 7/0617 |
| 2019/0120969 A1* | 4/2019 | Hamzeh | G01S 19/21 |
| 2019/0149249 A1* | 5/2019 | Raghavan | H04B 17/12 455/424 |
| 2019/0149365 A1* | 5/2019 | Chatterjee | H04L 25/0226 370/329 |
| 2019/0165853 A1* | 5/2019 | Smyth | H04W 16/14 |
| 2019/0165854 A1* | 5/2019 | Smyth | H04W 16/14 |
| 2019/0165855 A1* | 5/2019 | Smyth | H04W 16/14 |
| 2019/0173571 A1* | 6/2019 | Smyth | H04W 16/14 |
| 2019/0174449 A1* | 6/2019 | Shan | H04W 60/04 |
| 2019/0174466 A1* | 6/2019 | Zhang | H04L 5/0048 |
| 2019/0182007 A1* | 6/2019 | Liu | H04L 5/0048 |
| 2019/0199429 A1* | 6/2019 | Smyth | H04W 16/14 |
| 2019/0199430 A1* | 6/2019 | Smyth | H04W 16/14 |

* cited by examiner

MITIGATION OF CALIBRATION ERRORS

TECHNICAL FIELD

This application relates to wireless communication systems, and more particularly to improving transmission performance by mitigating calibration errors at a base station. Embodiments enable and provide solutions and techniques for improving calibration accuracy.

INTRODUCTION

A wireless communication network may include a number of base stations (BSs) that can support communication for a number of user equipments (UEs). In Long Term Evolution (LTE), BSs are referred to as evolved NodeBs (eNBs). In recent years, the carrier frequencies at which BSs and UEs communicate have continued to increase and include larger bandwidths. To take advantage of these higher frequencies, more antennas in the same physical aperture have been used. For these higher frequency bands to be useful and approximate the same coverage radius as prior technologies (such as 2G, 3G, or 4G), however, more beam forming gain (and more accurate) beamformed transmissions are becoming necessary.

Reciprocity describes the ability for a wireless device to use information (such as angles-of-arrival and delays) from one channel (e.g., the DL) in making determinations regarding another channel (e.g., the UL). In time-division duplexing (TDD) systems, after circuit mismatches have been compensated, the physical UL channel and the physical DL channel are identical (or transpositions of each other from a matrix algebra perspective) since UL and DL operate in the same frequency band. For example, BSs may compute UL channel estimates based on UL reference signals such as sounding reference signals (SRSs) transmitted by UEs and use the UL channel estimates for DL beamforming. In another example, the UE may compute DL channel estimates based on secondary synchronization block (SSB) or channel state information—reference signals (CSI-RS) transmissions transmitted from the BS and use this information for UL channel estimates in UL transmissions. However, in practice, a communication channel between a pair of nodes (e.g., a BS and a UE) includes not only the physical channel, but also radio frequency (RF) transceiver chains, for example, including antennas, low-noise amplifiers (LNAs), mixers, RF filters, and analog-to-digital (A/D) converters or digital-to-analog (D/A) converters, and in-phase quadrature-phase (I/Q) imbalances, which may be different between different nodes and/or different antennas. Thus, each node can introduce a mismatch, for example, in amplitude and/or phase, to transmitted and/or received signals. The mismatch may impact performance of channel reciprocity-based transmissions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for mitigation calibration errors. Implementations can occur from both network perspectives (e.g., at the base station (BS)-side) or non-network perspectives (e.g., UEs, relays, nodes, etc.). Calibration is the procedure by which phase and amplitude at every antenna are ensured to replicate the desired response with a certain excitation. Without calibration, receive beam weights may not produce the correct behavior as intended. Calibration helps correct the phase and amplitude mismatches between transmit and receive circuitry (e.g., due to mismatches in amplifiers, mixers, filters, couplers, etc.). Transmit and receive beam weights are typically assumed to be reciprocal. Accordingly, without calibration, the receive beam weights may not be reused for the transmission. Mitigation of phase and amplitude calibration errors may involve modifying the array size, transmission power levels, and/or a beam codebook at the BS-side.

For example, in an aspect of the disclosure, a method of wireless communication includes transmitting, by a base station via an antenna array including a plurality of antenna elements, a first communication signal using a first number of the plurality of antenna elements and a first transmission power level; receiving, by the base station from at least one user equipment, a measurement report based on the first communication signal; and transmitting, by the base station, a second communication signal using a second number of the plurality of antenna elements and a second transmission power level based on the measurement report, where the at least one of the first number of the plurality of antenna elements is different from the second number of the plurality of antenna elements or the first transmission power level is different from the second transmission power level.

In an additional aspect of the disclosure, an apparatus includes a transceiver configured to transmit, by a base station via an antenna array including a plurality of antenna elements, a first communication signal using a first number of the plurality of antenna elements and a first transmission power level; receive, by the base station from at least one user equipment, a measurement report based on the first communication signal; and transmit, by the base station, a second communication signal using a second number of the plurality of antenna elements and a second transmission power level based on the measurement report, where the at least one of the first number of the plurality of antenna elements is different from the second number of the plurality of antenna elements or the first transmission power level is different from the second transmission power level.

In an additional aspect of the disclosure, a computer-readable medium having program code recorded thereon, the program code includes code for transmitting via an antenna array including a plurality of antenna elements, a first communication signal using a first number of the plurality of antenna elements and a first transmission power level; code for receiving from at least one user equipment, a measurement report based on the first communication signal; and code for transmitting a second communication signal using a second number of the plurality of antenna elements and a second transmission power level based on the measurement report, where the at least one of the first number of the plurality of antenna elements is different from the second number of the plurality of antenna elements or the first transmission power level is different from the second transmission power level.

In an additional aspect of the disclosure, an apparatus includes means for transmitting a first communication signal using a first number of a plurality of antenna elements and a first transmission power level; means for receiving, from at least one user equipment, a measurement report based on the first communication signal; and means for transmitting a second communication signal using a second number of the plurality of antenna elements and a second transmission power level based on the measurement report, where the at least one of the first number of the plurality of antenna elements is different from the second number of the plurality of antenna elements or the first transmission power level is different from the second transmission power level.

In some examples, in an aspect of the disclosure, a method of wireless communication includes receiving, by a user equipment from a base station, a first communication signal; transmitting, by the user equipment to the base station, a request to change at least one of an antenna array size at the base station or a transmit power level at the base station based on the first communication signal; and receiving, by the user equipment from the base station, a second communication signal in response to the request.

In an additional aspect of the disclosure, an apparatus includes a transceiver configured to receive, by a user equipment from a base station, a first communication signal; transmit, by the user equipment to the base station, a request to change at least one of an antenna array size at the base station or a transmit power level at the base station based on the first communication signal; and receive, by the user equipment from the base station, a second communication signal in response to the request.

In an additional aspect of the disclosure, a computer-readable medium having program code recorded thereon, the program code includes code for receiving, by a user equipment from a base station, a first communication signal; code for transmitting, by the user equipment to the base station, a request to change at least one of an antenna array size at the base station or a transmit power level at the base station based on the first communication signal; and code for receiving, by the user equipment from the base station, a second communication signal in response to the request.

In an additional aspect of the disclosure, an apparatus includes means for receiving, from a base station, a first communication signal; means for transmitting, by the user equipment to the base station, a request to change at least one of an antenna array size at the base station or a transmit power level at the base station based on the first communication signal; and means for receiving, from the base station, a second communication signal in response to the request.

Other aspects, features, and embodiments of the present invention will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
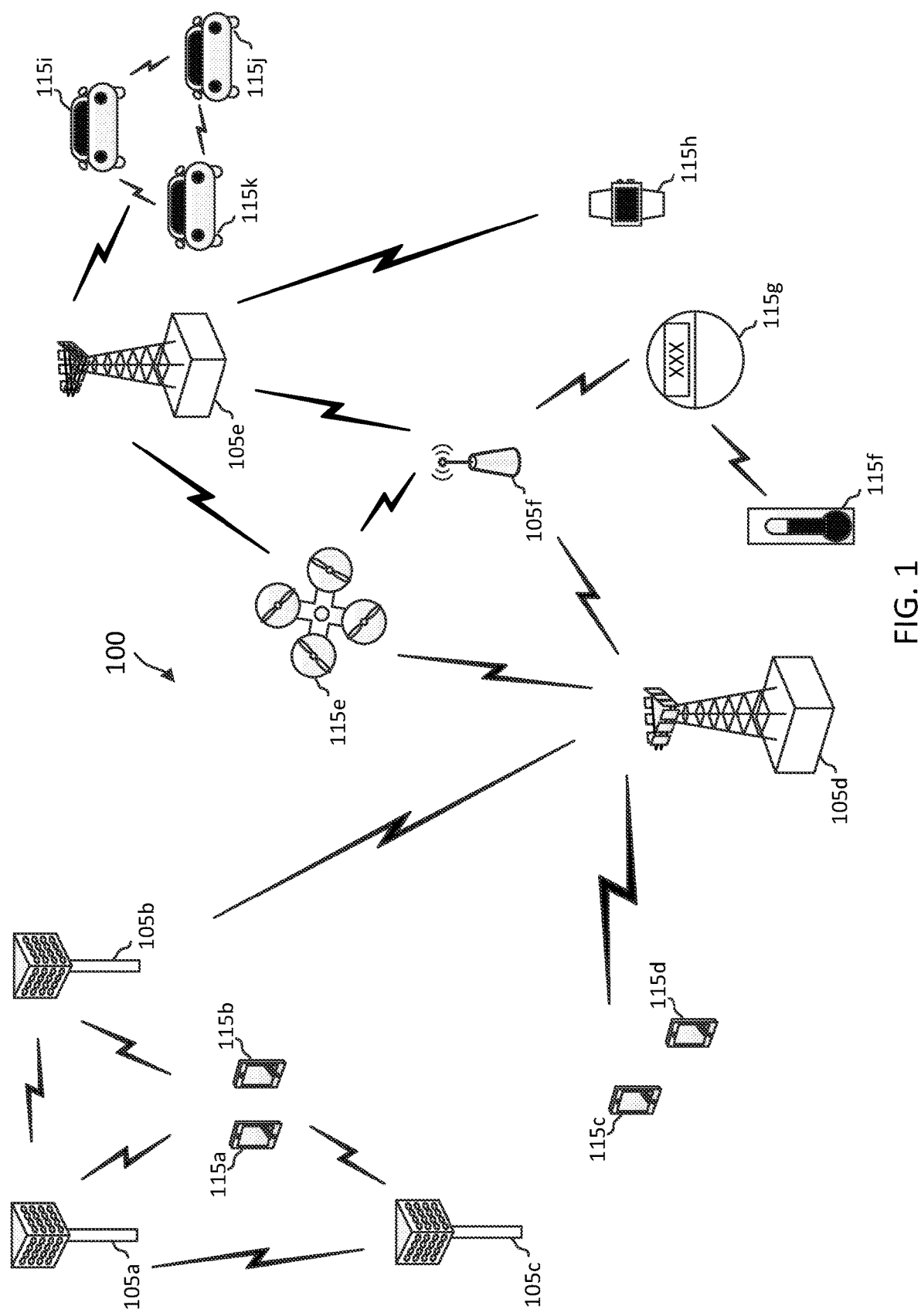
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Beam management operations are based on the control messages that are periodically exchanged between transmitter and receiver nodes. Beamforming may be used to bridge the link budget, which may be quite pessimistic at mmWave frequencies due to the heavy propagation loss. The BS and UE may communicate information using beams, and each of the BS and the UE may steer its energy in a particular direction, reaping array gains in the process and bridging the link budget. In particular, the BS transmits DL information and the UE receives the DL information using the beams. Subsequently, when the UE transmits UL information, the UE may set the beam weight corresponding to the same direction as the previously mentioned beam and transmit UL data with the same beam weights, assuming it has reciprocity.

Beamforming may rely on the design of good beamforming codebooks. These codebooks, however, may perform as designed when the amplitude and phase at the antennas are reasonably well calibrated. The BS may have a large amount of antennas, and near-perfect amplitude and phase calibration may demand a lot of time, complexity, and effort. It may be desirable to mitigate phase and amplitude calibration errors at the BS.

The present disclosure provides techniques for mitigating phase and amplitude calibration errors in communications between a user equipment (UE) and a base station (BS). Due to various factors, the DL and UL channels may lack reciprocity. With calibration, the adjusted beam weights may be used for receiving and transmitting data. Calibration is the procedure by which phase and amplitude at every antenna are ensured to replicate the desired response with a certain excitation. Without calibration, receive beam weights may not produce the correct behavior as intended. Calibration helps correct the phase and amplitude mismatches between transmit and receive circuitry (e.g., due to mismatches in amplifiers, mixers, filters, couplers, etc.). Transmit and receive beam weights are typically assumed to be reciprocal. Accordingly, without calibration, the receive beam weights may not be reused for the transmission.

While per-antenna calibration can be performed, it can be time-consuming, complex, and manually intensive. Even assuming it is performed on a per-antenna basis, residual errors in phase and amplitude for each antenna (e.g., due to measurement precision and time spent on calibration) may occur. Additionally, with regard to time-varying calibration error, calibration is typically done on a per-frequency/subcarrier and per-temperature (value) basis. Due to complexity, only a finite number of points may be sampled across frequency and temperature. Once an operating frequency or a number of component carriers is determined, the only variation(s) come from temperature drifts. Due to finite sampling, time-varying phase and amplitude calibration errors may occur.

Aspects of the technology discussed herein can provide several benefits. For example, mitigation of phase and/or amplitude calibration errors at the BS-side may result in better performance. NR frequency bands may have high path loss and may be less stable than the LTE frequency bands due to high frequencies. Thus, mitigation of phase and/or amplitude calibration errors can improve NR network coverage. These benefits and other features are recognized and discussed below.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In some embodiments, the BS 105 can coordinate with the UE 115 to cooperatively schedule, beamform, and/or transmit data in the network 100. Substantial gain may be achieved through greater use of a multiple antenna system. In mmWave access, for example, a large number of antenna elements may be used to take advantage of shorter wavelengths, and to enable beamforming and beam-tracking. The higher the frequencies, the greater the propagation and penetration losses may be.

Beamforming techniques may be used to increase the signal level received by a device and to avoid transmission losses when using, for example, mmWave frequencies. A beamformer enhances energy over its targeted/intended direction(s), obtaining a certain antenna gain in a given direction while having attenuation in others. Beamforming combines signals from multiple antenna elements in an antenna array, so that the combined signal level increases when several signal phases align (constructive interference). Each antenna array may include a plurality of antenna elements. The signals from each antenna element are transmitted with a slightly different phase (delay) to produce a narrow beam directed towards the receiver.

Due to various factors, the DL and UL channels may lack reciprocity for various reasons. Example scenarios in which the DL and UL channels may lack reciprocity include use of poor RF components on either the DL or the UL, poor calibration efforts to adjust the DL/UL circuitry, drift of component behavior with time, temperature, and other parameters, etc. The calibration procedure may involve determining nominal differences between the DL and UL circuitry.

While per-antenna calibration can be performed, it can be time-consuming, complex, and manually intensive. Even assuming it is performed on a per-antenna basis, residual errors in phase and amplitude for each antenna (e.g., due to measurement precision and time spent on calibration) may occur. Additionally, with regard to time-varying calibration errors, calibration is typically done on a per-frequency/subcarrier and per-temperature (value) basis. Due to complexity, only a finite number of points may be sampled across frequency and temperature. Once an operating frequency or number of common carriers is determined, the only variation(s) may come from temperature drifts.

Due to finite sampling, time-varying phase and amplitude calibration errors may occur. In terms of phase calibration error, it may be reasonable to assume that the phase at the i-th antenna at any point in time satisfies the following equation:

$$\phi_i = \hat{\phi}_i = \varepsilon_i, \qquad (1)$$

where $\phi_i$ represents a measured phase, $\hat{\phi}_i$ represents a true phase, and $\varepsilon_i$ represents a phase error in calibration.

The phase calibration error may be uniformly distributed in +/−q degrees in accordance with the following equation:

$$\varepsilon_i \sim U(-q, q), \qquad (2)$$

The phase calibration error may be uniformly distributed with some small angular resolution of +/−q degrees. In an example, q is 5°, which may be reasonable based on low calibration, but may result in an approximate error of +/−20° for low-complexity calibration.

In terms of amplitude calibration error, it may be reasonable to assume that the amplitude at the i-th antenna at any point in time satisfies the following equation:

$$\alpha_i = \hat{\alpha}_i + \vartheta_i, \qquad (3)$$

where $\alpha_i$ represents a measured amplitude, $\hat{\alpha}_i$ represents a true amplitude, and $\zeta_i$ represents an amplitude calibration error in calibration.

The amplitude calibration error may be uniformly distributed in +/−A amplitude units in accordance with the following equation:

$$\vartheta_i \sim U(-A, A), \qquad (4)$$

The amplitude calibration error may be uniformly distributed with some small angular resolution of +/−A amplitude units.

Another impairment aside from the phase and amplitude calibration errors may involve the failure of a certain fraction of the antennas. Random antenna failures may occur, where $\alpha_i$ may be assumed to be zero for some indices. In an example, if a certain percentage of antennas in a 32×4 antenna array at the BS-side are dropped or failed (e.g., one, two, five, ten, fifteen, and twenty percent), the worst-case performance may degrade dramatically. In this example, the smallest percentage drop may be one percent. If five percent of the antennas are dropped, the worst-case gain in coverage area may go from about −6 dB to about −15 dB. In an example, an antenna is "dropped" if it is excluded from being used for transmitting a communication signal, thus decreasing the number of antennas used for transmitting the communication signal. Conversely, an antenna is "added" if it is included (and was previously excluded) for use in transmitting a communication signal, thus increasing the number of antennas used for transmitting the communication signal. The array is reconfigured for optimal phase/amplitude or for compensating the phase/amplitude calibration errors for one or more beams in a particular sector.

Additionally, the aforementioned errors may be time-varying. For example, at one point in time, the errors may be between +/−5°, but if the array at the BS 105 heats up and the temperature drifts, the expected nominal temperature may drift away by about 10°. If the calibration is not performed using that actual temperature (rather than the expected temperature), a +/−20° error may result. Moreover, if the size of the BS 105's antenna array is large, a large amount of net accumulation due to the above-mentioned impairments may occur.

A codebook includes beam weights for a collection of beams used to cover the BS 105's coverage area. A codebook may be designed a priori, and the BS may use the codebook to apply a specific set of beam weights to point signals in a certain direction. For example, an array that covers 120° in azimuth and 50° in elevation may use four beams. Each beam may include a collection of beam weights applied to the antennas. A first beam may point in a first direction, a second beam may point in a second direction, a third beam may point in a third direction, and a fourth beam may point in a fourth direction. Each of these four beams covers a distinct region of the coverage area, and in particular, the BS may use the four beams to cover the 120°×50° coverage area. The latency associated with the initial acquisition, refinement, or other beamforming procedure may be dependent on the codebook size (e.g., four, eight, sixteen, thirty-two). The greater the codebook size, the more refined the link may be, resulting in a better beamforming gain.

With regard to codebooks, even a small phase calibration error +/−5° may result in substantial worst-case gain deterioration for a small codebook size. Additionally, a moderate phase calibration error +/−20° can result in significantly large performance deterioration. Significant deterioration in performance may result from poor amplitude calibration or from a substantial fraction of antennas being lost. The above impairments may have a larger effect on small-sized codebooks compared to large-sized codebooks due to more redundancy in beam weights in the latter. For example, for a size four codebook, a worst-case gain over a 120°×50° coverage area may be poor because a large array size is used to cover a huge area with small number of beams. For good coverage, the latency may be reduced. If the size four codebook entry has a +/−5° error uniformly distributed, the cumulative distribution function (CDF) of the worst-case gain may range from about −5.5 to about −8 dB. If the size four codebook entry has a +/−25° error uniformly distributed, the worst-case gain may range from about −7 to about −15 dB. The greater the calibration error, the worse the performance may be in terms of worst-case gain for the coverage area. The BS is unware of where the UE may be located and may be interested in improving the performance, even for the worst-case scenario.

It may be desirable to mitigate phase and amplitude calibration errors at the BS. In some examples, mitigation of phase and amplitude calibration errors may involve modifying the array size, transmission power levels, and/or a beam codebook at the BS-side.

Figure 2:
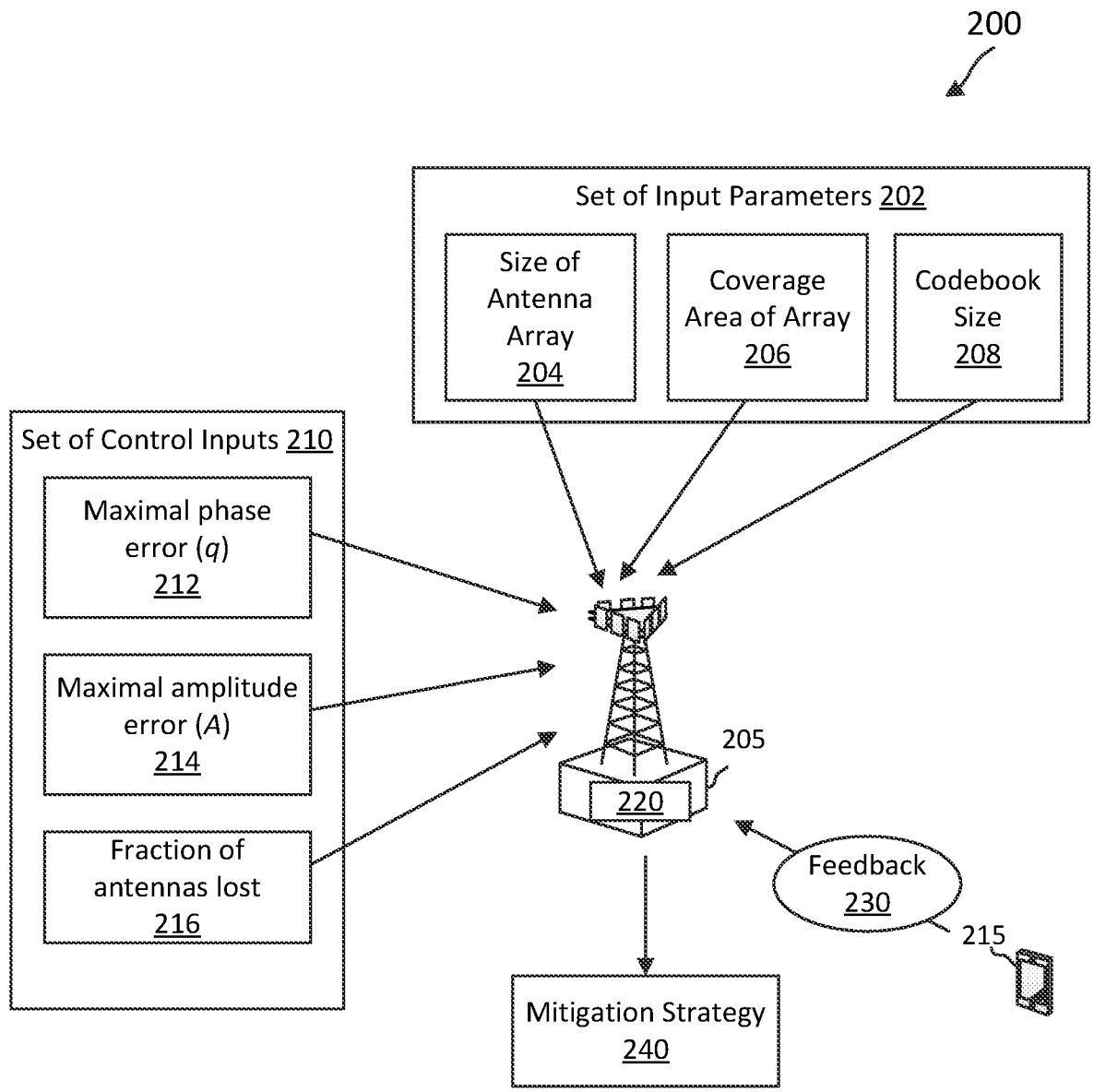
FIG. 2 illustrates a communication method according to some embodiments of the present disclosure.

FIG. 2 illustrates a communication method 200 according to some embodiments of the present disclosure. As shown in diagram 200, a set of input parameters 202 and a set of control inputs 210 are associated with a BS 205. A set of input parameters 202 and set of control inputs 210 may be used to modify the antenna array size or codebook size for transmitting data. Set of input parameters 202 may include a size of antenna array 204, a coverage area of array 206, and a codebook size 208, among other input parameters. Set of control inputs 210 may include a maximal phase calibration error q 212, a maximal amplitude calibration error A 214, and a fraction of antennas lost 216, among other control inputs.

The BS 205 includes a plurality of antenna elements 220. In an example, the plurality of antenna elements includes 128 antenna elements (32×4 antenna array), and the codebook size is four. A codebook size of four is small and constrained compared to larger sizes (e.g., eight, sixteen, or thirty-two). Rather than use the 32×4 array, the BS 204 may use a reduced size array (e.g., 16×4 antenna array) to cover the same coverage area 206 and with the same codebook size 208. The BS 205 may increase the transmit power to be within the effective isotropic radiated power (EIRP)/total radiated power (TRP) limit for transmission due to the lost peak array gain from the antenna array size reduction.

In the ideal case of no phase calibration error, use of the 16×4 antenna array by the BS 205 in terms of performance may be poorer than using the 32×4 antenna array. However, by reducing the antenna array size from 32×4 to 16×4, the performance may be more robust to phase calibration errors. For example, if the BS 205 performed with a +/−10° error with the 32×4 array size, the use of the 16×4 array size with the same +/−10° error may not cause the worst-case scenario to suffer too much. In the presence of a phase calibration error, the 16×4 antenna array provides better performance than the 32×4 antenna array by a 3 dB boost. In this example, the peak powers for these two arrays may match, but the 16×4 antenna array provides more robustness to the worst-case power scenario.

If the BS 205 uses a codebook that is small in size, the design may not provide for robustness to phase and amplitude calibration errors. If the BS 205 uses a large array, a number of antennas from the array may be left unused (e.g., 50% of the antennas), resulting in the loss of 3 dB in terms of peak array gain. The loss may be compensated by increasing the EIRP by 3 dB such that the net power steered in a particular direction stays the same.

The BS 205 may receive feedback 230 from one or more UEs 215 to determine whether to modify the antenna array size and/or the power transmit level. Modification may occur to support changing an effective array size (e.g., for broadened beams). The feedback 230 may be an indication to the BS 205 to modify the first number and the first transmission power level for subsequent signal transmissions. The feedback 230 from one or more UEs may guide the BS 205 in its determination of whether to modify the number antenna elements and/or the transmission power level for future signal transmissions. In an example, the feedback 230 is a measurement report including at least one of a reference signal received power (RSRP), a reference signal received quality (RSRQ), a received signal strength indicator (RSSI), a signal-to-interference-plus-noise ratio (SINR), or a signal-to-noise ratio (SNR) from one or more UEs 215. It may be advantageous for a UE to provide this type of information in a measurement report that is sent to the BS because it provides the BS with feedback the UE's experience. For example, if the BS is provided with an indication (via measurement reports) that multiple UEs are experiencing poor RSRP levels, the BS may determine that the poor performance is due to phase and/or amplitude calibration errors. To mitigate these calibration errors, the BS may modify the array size and/or the transmission power level for future signal transmissions.

With reference to FIG. 2, the BS 205 may have sufficient processing power to determine a mitigation strategy 240. A mitigation strategy may include determining whether to modify the array size and the transmission power level for future signal transmissions. In this example, the BS may modify the transmission power level and the array size (e.g., by decreasing the array size and increasing the transmission power level if the error estimate is large or by increasing the array size and decreasing the transmission power level if the error estimate is small) based on the feedback from one or more UEs.

The BS may modify the transmission power level and the array size based on an aggregate of power reports of multiple UEs (e.g., UE action requests and phase/amplitude calibration error information). The BS may adjust/refine the codebook based on the feedback. For example, the BS may go from using a size four codebook to a size eight or a size sixteen codebook. Using information from the UEs in the coverage area, the BS may perform a codebook adjustment at the BS. Thus, codebook changes can be done as a function of information contained in aggregated UE reports. If the net performance at the UEs improve, the BS codebook adjustment is in the correct direction and iterates this process to improve the codebook. Additionally, the BS may improve the calibration accuracy with a built-in test mode (e.g., an online/mission mode calibration or self-test).

A self-test may include reviewing operational characteristics and adjusting antenna array usage parameters based on reviewing results of the self-test. By performing a self-test, a BS can improve operational performance or perform in accordance with desired network design conditions. Self-test details may be stored in a memory at the BS and/or periodically updated throughout operations as desired.

Figure 3:
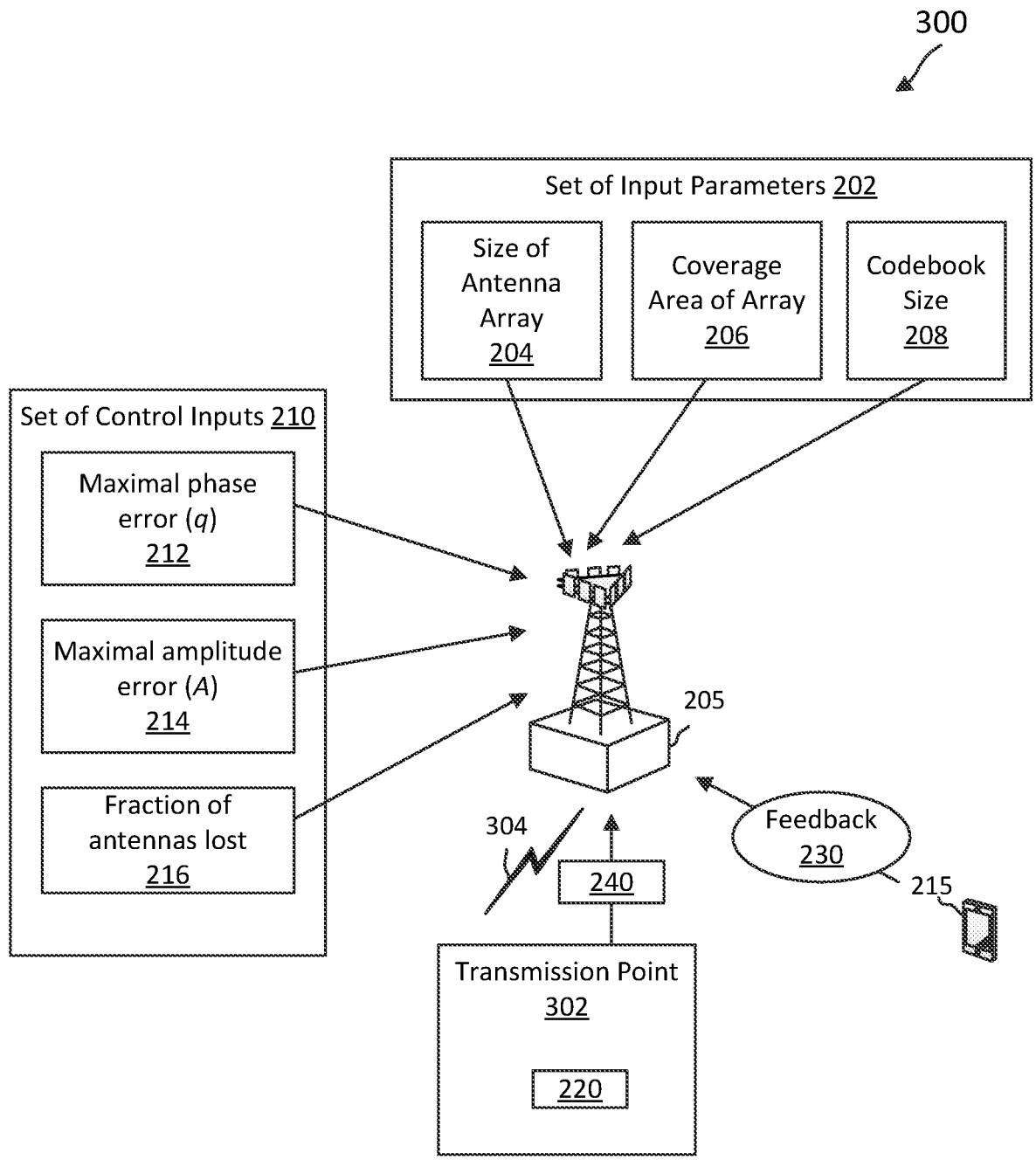
FIG. 3 illustrates a communication method according to some embodiments of the present disclosure.

FIG. 3 illustrates a communication method 300 according to some embodiments of the present disclosure. FIG. 3 includes the BS 205, the set of input parameters 202, and the set of control inputs 210. The BS 205 is coupled to a transmission point 302 via a link 304. The transmission point 302 includes the plurality of antenna elements 220. In some examples, the link 304 is an optical fiber link between the BS and the transmission point 302. The BS 205 may forward feedback 230 from one or more UEs to the transmission point 302.

With reference to FIG. 3, the BS 205 may have little in terms of computational intelligence. For example, the BS may be small and a large antenna array (e.g., 32×4) may be unable to fit in the BS. In this example, the BS may forward to a transmission point (e.g., server) the feedback (e.g., measurement report) from the UE and instantaneous information on phase and/or amplitude calibration errors (e.g., temperature estimate and a lookup table for calibration interpolation error). The transmission point 302 processes the information forwarded by the BS and feeds the mitigation strategy 240 back to the BS. Although not shown, the transmission point 302 may be used by one or more BS for mitigating amplitude and phase calibration errors. The transmission point 302 may be, for example, a server, a network-level device, or other device.

In some examples, if a sufficient number of UEs report a power metric (e.g., RSRP, RSRQ, RSSI, SINR, or SNR) below a particular threshold, the BS may modify the array size and the transmission power level (e.g., by decreasing the array size and increasing the transmission power level or by increasing the array size and decreasing the transmission power to improve the BS's worst-case coverage). In some examples, the transmission point may suggest a codebook adjustment (e.g., increase or decrease the codebook size) or refinement. In some examples, the transmission point improves calibration accuracy with a built-in test mode (e.g., an online mode/mission mode calibration).

Figure 4:
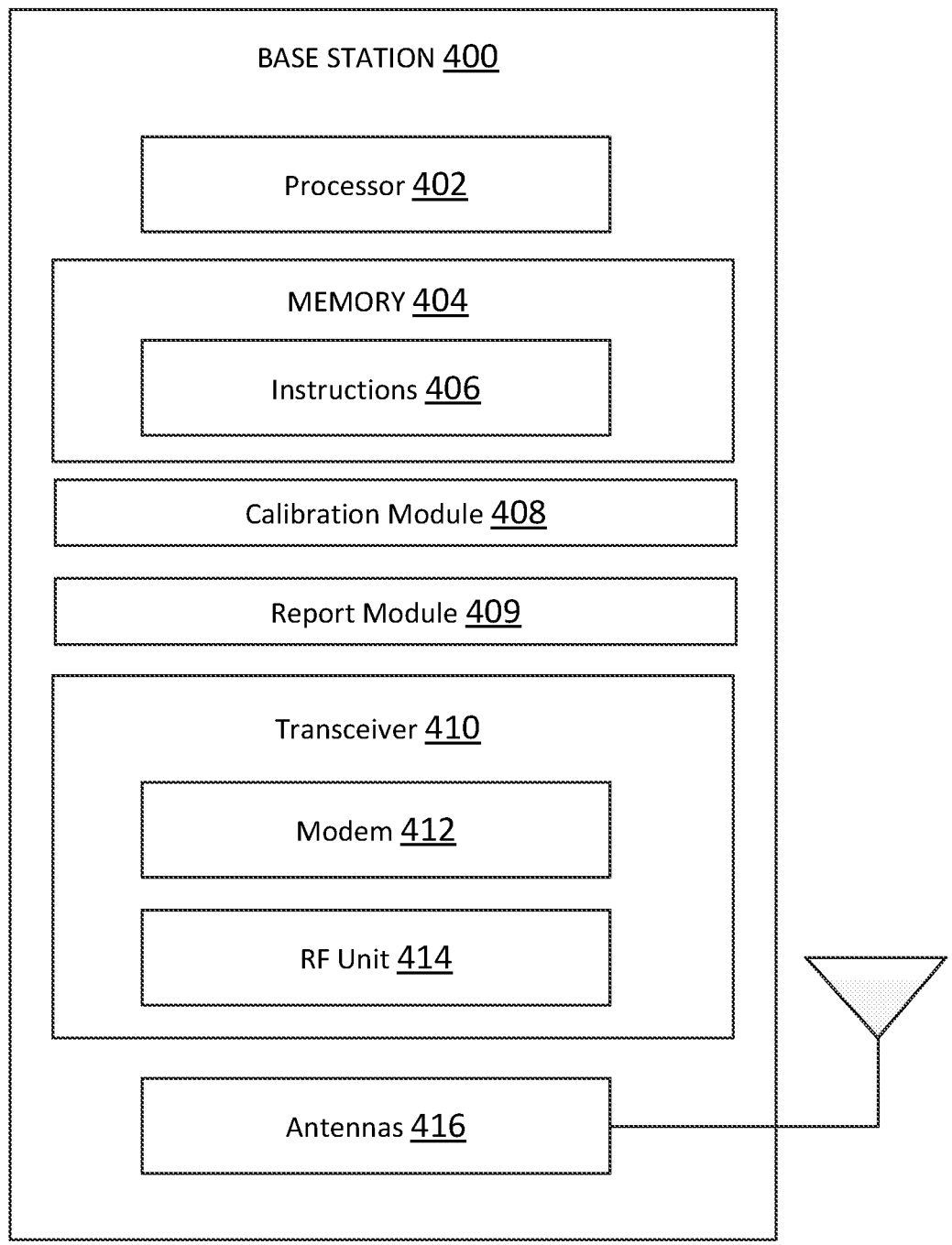
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. As shown, the BS 400 may include a processor 402, a memory 404, a calibration module 408, a report module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of calibration module 408 and report module 409 may be implemented via hardware, software, or combinations thereof. For example, each of calibration module 408 and report module 409 may be implemented as a processor, circuit, and/or instructions 406 stored in the memory 404 and executed by the processor 402.

Each of calibration module 408 and report module 409 may be used for various aspects of the present disclosure. For example, the calibration module 408 may be configured to transmit, via an antenna array including a plurality of antenna elements, a first communication signal using a first number of the plurality of antenna elements and a first transmission power level. The report module 409 may be configured to receive, from at least one UE, a measurement report based on the first communication signal. The calibration module 408 may perform calibration for the mismatch based on the measurement report. For example, the calibration module 408 may increase the number of antenna elements and decrease the transmission power level for future communication signal transmissions. In another example, the calibration module 408 may decrease the number of antenna elements and increase the transmission power level for future communication signal transmissions.

The calibration module 408 may be further configured to transmit a second communication signal using a second number of the plurality of antenna elements and a second transmission power level based on the measurement report. At least one of the first number of the plurality of antenna elements is different from the second number of the plurality of antenna elements, or at least one of the first transmission power level is different from the second transmission power level. The calibration module 408 may be further configured to transmit the first communication signal beam, a beam codebook, adjust or refine the beam code book based on the measurement report, and transmit the second communication signal based on the adjusted beam code book. Mechanisms for mitigating phase and amplitude calibration errors for communications between a BS and a UE are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data from the memory 404, the calibration module 408, and/or the report module 409 according to a modulation and coding scheme (MCS), e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
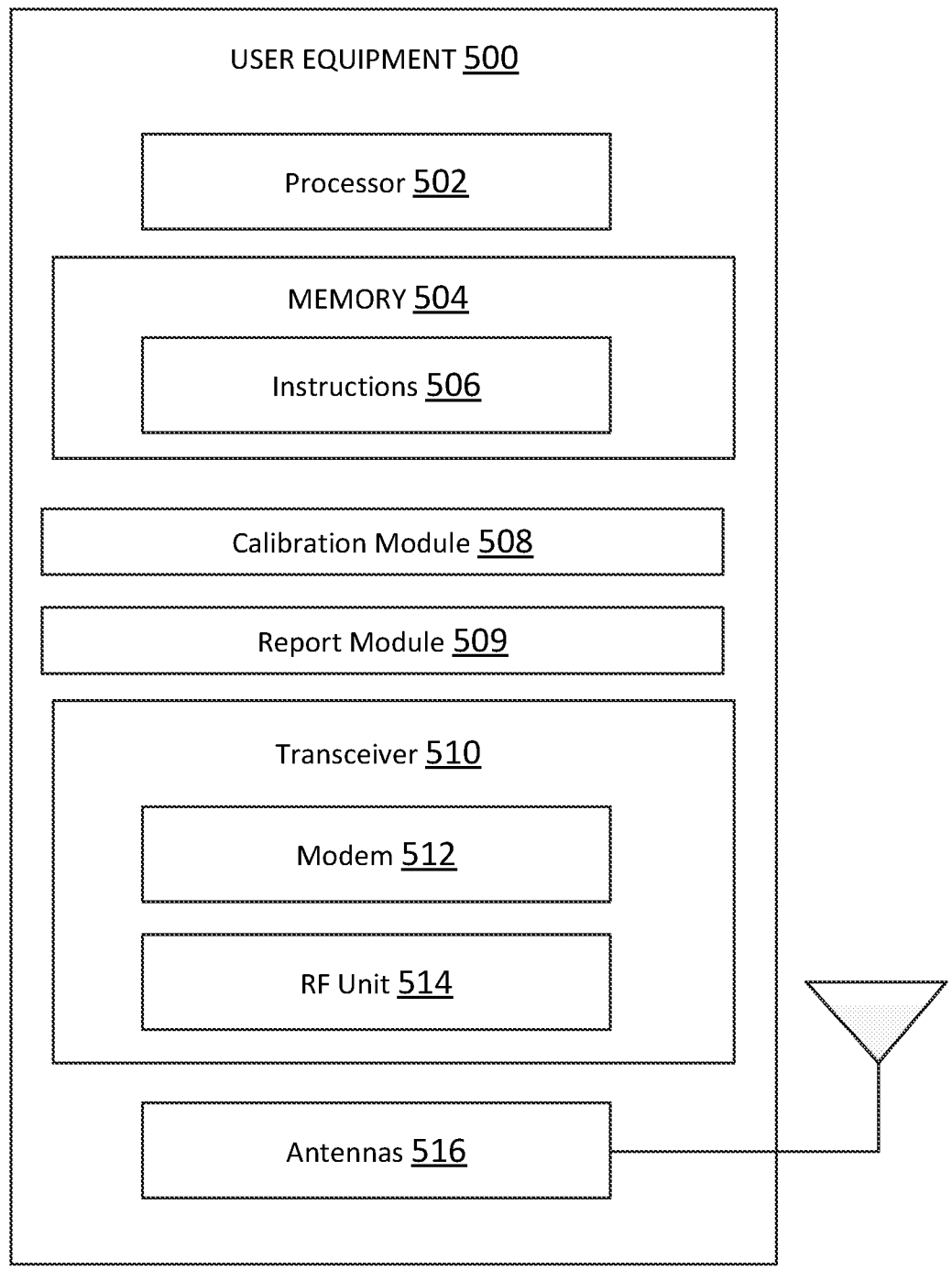
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 as discussed above. As shown, the UE 500 may include a processor 502, a memory 504, a calibration module 508, a report module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 115 in connection with embodiments of the present disclosure. Instructions 506 may also be referred to as code, which may be interpreted broadly to include any type of computer-readable statement(s) as discussed above with respect to FIG. 4.

Each of calibration module 508 and report module 509 may be implemented via hardware, software, or combinations thereof. For example, each of calibration module 508 and report module 509 may be implemented as a processor, circuit, and/or instructions 506 stored in the memory 504 and executed by the processor 502.

Each of calibration module 508 and report module 509 may be used for various aspects of the present disclosure. For example, the calibration module 508 may be configured to receive a first communication sign from a BS (e.g., the BSs 105). The report module 509 may be configured to transmit to the BS, a request to change at least one of an antenna array size at the base station, a transmit power level at the base station, and/or a beam codebook based on the first communication signal. The calibration module 508 may be configured to receive from the base station, a second communication signal in response to the request.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, the calibration module 508, and/or the report module 509 according to a MCS, e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as another UE or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
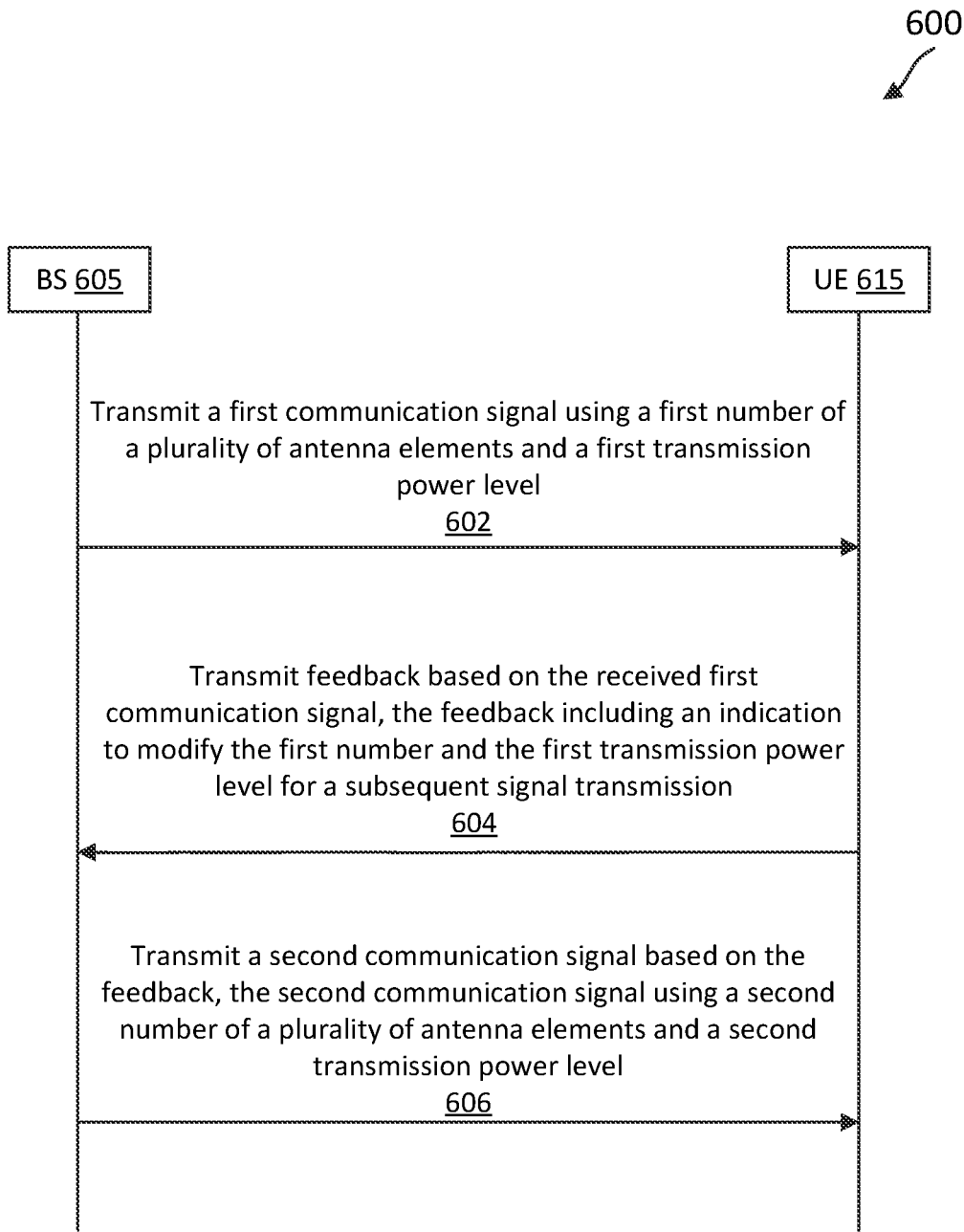
FIG. 6 illustrates a signaling diagram of a method for mitigating calibration errors according to some embodiments of the present disclosure.

FIG. 6 illustrates a signaling diagram of a method 600 for mitigating calibration errors according to some embodiments of the present disclosure. Steps of the method 600 can be executed by computing devices (e.g., a processor, processing circuit, and/or other suitable component) of wireless communication devices, such as the BSs 105 and 400 and the UEs 115 and 500. The method 600 can be better understood with reference to FIGS. 2 and 3. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS and one standalone UE for purposes of simplicity of discussion, though it will be recognized that embodiments of the present disclosure may scale to many more UEs and/or BSs.

At step 602, a BS 605 transmits a first communication signal using a first number of a plurality of antenna elements and a first transmission power level to a UE 615. In an example, the BS 605 includes an antenna array including the plurality of antenna elements. In this example, the BS 605 determines the first number of the plurality of antenna elements and/or the first transmission power level based on at least one of a size of the antenna array, a coverage area for the antenna array, a codebook size, a latency, a phase calibration error, an amplitude calibration error, or a fraction of failed antenna elements. In another example, a transmission point (e.g., transmission point 302 in FIG. 3) includes an antenna array including the plurality of antenna elements and is remote from the BS. In this example, the BS transmits the first communication signal to a UE via the transmission point.

The UE 615 receives the first communication signal from the BS 605. At step 604, the UE 615 transmits feedback based on the received first communication signal, the feedback including an indication to modify the first number and the first transmission power level for a subsequent signal transmission. In an example, the feedback includes a request to change at least one of an antenna array size at the BS 605 or a transmit power level at the BS 605 based on the first communication signal. In an example, the feedback includes a measurement report including at least one of a RSRP, a RSRQ, a RSSI, a SINR, or a SNR corresponding to a best beam pair from one or more UEs.

The BS 205 may compare the measurement report to a threshold. In an example, the measurement report includes a RSRP, RSRQ, RSSI, SINR, or SNR metric corresponding to the best beam pair from the UE. If a certain fraction of the UE's power level reports satisfies the threshold (e.g., is below or above the threshold), the BS 205 may modify the number of the plurality of antenna elements and/or the transmission power level for future signal transmissions. The BS 605 may determine the second number of the plurality of antenna elements and/or the second transmission power level based on a comparison between the measurement report and the threshold.

At step 606, the BS 605 transmits a second communication signal based on the feedback to the UE 615, the second communication signal using a second number of the plurality of antenna elements and a second transmission power level. The BS 605 may use a combination of the feedback from one or more UEs, phase calibration error information, and/or amplitude calibration error information in its decision to modify the number of antenna elements and the transmission power level for future communication signal transmissions.

The BS 605 may determine the second number of the plurality of antenna elements and the second transmission power level based on the feedback. In an example, the BS 605 decreases the array size and increases the transmission power level such that the first number of the plurality of antenna elements is less than the second number of the plurality of antenna elements and the first transmission power level is greater than the second transmission power level. In another example, the BS 605 increases the array size and decreases the transmission power level such that the first number of the plurality of antenna elements is greater than the second number of the plurality of antenna elements and the first transmission power level is less than the second transmission power level. Additionally, the BS 605 may transmit the second communication signal by applying a codebook including beamforming weights. The BS 605 may adjust the beamforming weights in the codebook based on the feedback (e.g., measurement report).

Figure 7:
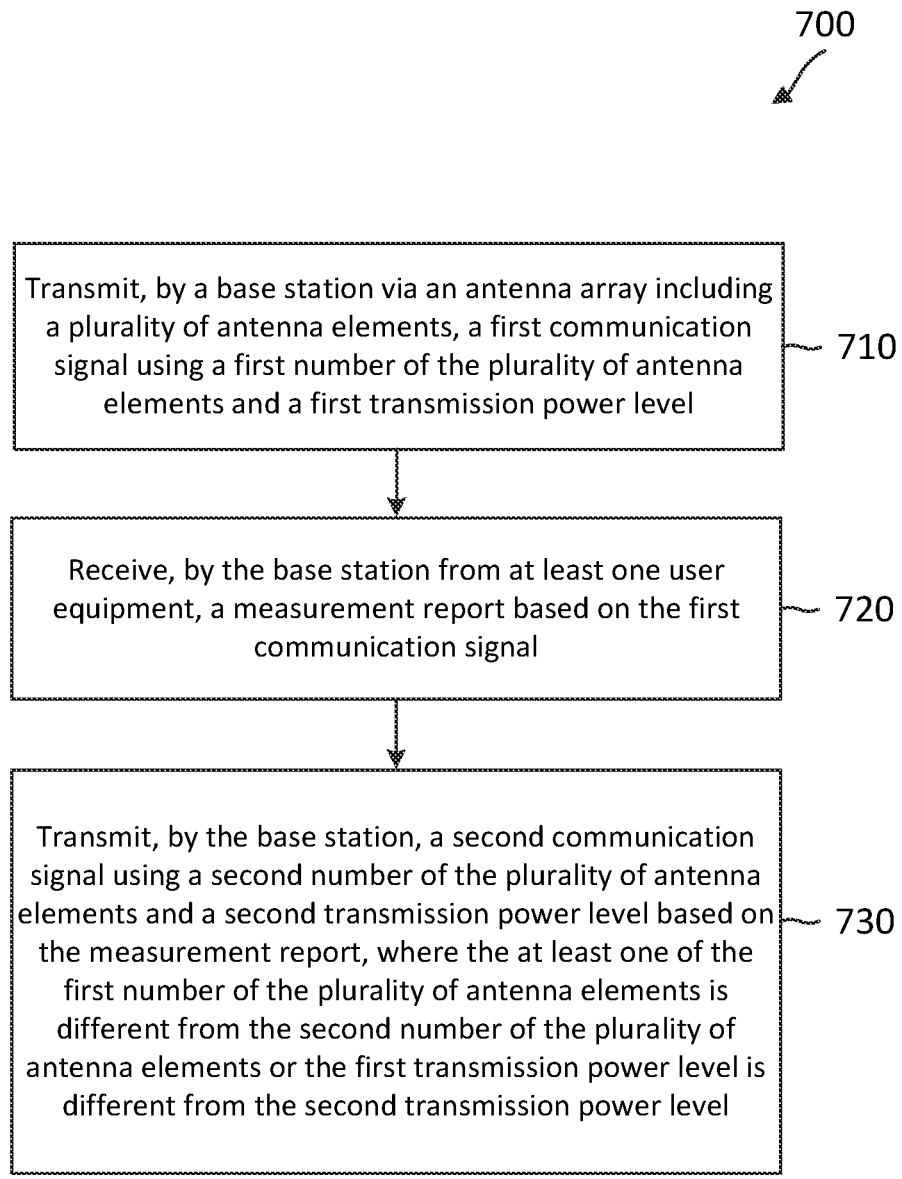
FIG. 7 is a flow diagram of a communication method according to embodiments of the present disclosure.

FIG. 7 is a flow diagram of a communication method 700 according to embodiments of the present disclosure. Steps of the method 700 can be executed by a computing device (e.g., a processor, processing circuit, and/or other suitable component) of a wireless communication device, such as the BSs 105 and 400. The method 700 may employ similar mechanisms as in the methods 200 and 300 described with respect to FIGS. 2 and 3, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes transmitting, by a base station via an antenna array including a plurality of antenna elements, a first communication signal using a first number of the plurality of antenna elements and a first transmission power level. In an example, the BS includes an antenna array including the plurality of antenna elements. In this example, the BS determines the first number of the plurality of antenna elements and/or the first transmission power level based on at least one of a size of the antenna array, a coverage area for the antenna array, a codebook size, a latency, a phase calibration error, an amplitude calibration error, or a fraction of failed antenna elements. In another example, a transmission point (e.g., transmission point 302 in FIG. 3) includes an antenna array including the plurality of antenna elements and is remote from the BS. In this example, the BS transmits the first communication signal to a UE via the transmission point.

At step 720, the method 700 includes receiving, by the base station from at least one user equipment, a measurement report based on the first communication signal. In an example, the measurement report includes at least one of a RSRP, a RSRQ, a RSSI, a SINR, or a SNR metric corresponding to a best beam pair from a UE. The BS may receive multiple measurement reports from multiple UEs.

At step 730, the method 700 includes transmitting, by the base station, a second communication signal using a second number of the plurality of antenna elements and a second transmission power level based on the one or more measurement reports, where the at least one of the first number of the plurality of antenna elements is different from the second number of the plurality of antenna elements or the first transmission power level is different from the second transmission power level. The BS may determine the second number of the plurality of antenna elements and/or the second transmission power level based on a comparison between the measurement report and a threshold. In an example, the BS determines to modify the number of plurality of antenna elements used for transmitting the second communication signal from the first number to the second number and determines to modify the transmission power level used for transmitting the second communication signal from the first the first transmission power level to the second transmission power level.

The BS may compare the data included in the one or more measurement reports to the threshold. In an example, a measurement report includes at least one of a RSRP, RSRQ, RSSI, SINR, or SNR metric corresponding to the best beam pair from the UE. If a certain fraction of the UE's power level reports satisfies the threshold (e.g., is below or above the threshold), the BS may modify the number of the plurality of antenna elements and/or the transmission power level for future signal transmissions. In an example, the BS may increase the number of antenna elements and decrease the transmission power level for future communication signal transmissions. In another example, the BS may decrease the number of antenna elements and increase the transmission power level for future communication signal transmissions.

In some examples, a plurality of UEs sends the BS a measurement report. Accordingly, the BS receives a plurality of measurement reports. The BS may aggregate the plurality of measurement reports and determine, based on the aggregated measurement reports, to transmit the second communication signal using the second number of the plurality of antenna elements and the second transmission power level. The changes made to adjust the antenna element array size may happen at any time and may be based on feedback from one or more UEs (e.g., based on a measurement report).

Figure 8:
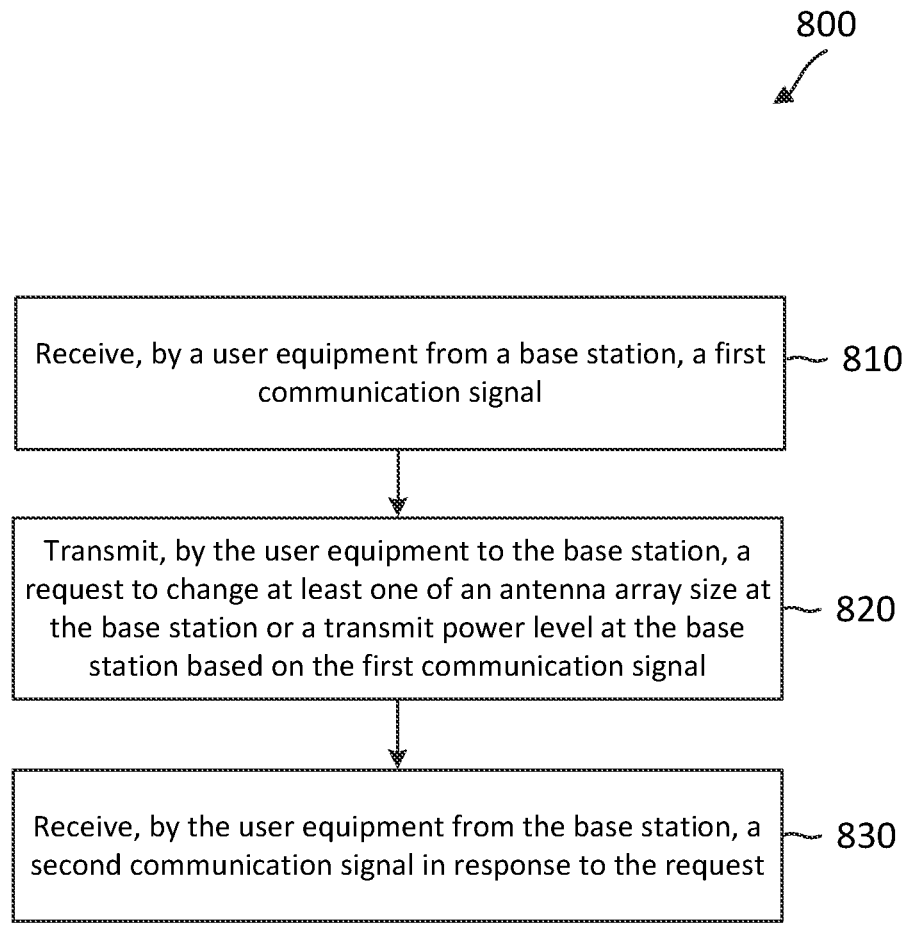
FIG. 8 is a flow diagram of a communication method according to embodiments of the present disclosure.

FIG. 8 is a flow diagram of a communication method 800 according to embodiments of the present disclosure. Steps of the method 800 can be executed by a computing device (e.g., a processor, processing circuit, and/or other suitable component) of a wireless communication device, such as the UEs 115 and 500. The method 800 may employ similar mechanisms as in the methods 200 and 300 described with respect to FIGS. 2 and 3, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, by a user equipment from a base station, a first communication signal. In an example, the UE receives the first communication signal from the BS via a link that connects the UE and the BS. In another example, the UE receives the first communication signal from the BS via the transmission point.

At step 820, the method 800 includes transmitting, by the user equipment to the base station, a request to change at least one of an antenna array size at the base station or a transmit power level at the base station based on the first communication signal. In an example, the UE transmits a request to change the antenna array size at the BS based on the first communication signal. In another example, the UE transmits a request to change the transmit power level at the base BS based on the first communication signal.

At step 830, the method 800 includes receiving, by the user equipment from the base station, a second communication signal in response to the request. In an example, the BS modifies the antenna array size and/or the transmit power level at the base station in accordance with the request and transmits the second communication signal using the modified antenna array size and/or the transmit power level.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, including transmitting, by a base station via an antenna array including a plurality of antenna elements, a first communication signal using a first number of the plurality of antenna elements and a first transmission power level; receiving, by the base station from at least one user equipment, a measurement report based on the first communication signal; and transmitting, by the base station, a second communication signal using a second number of the plurality of antenna elements and a second transmission power level based on the measurement report, wherein the at least one of the first number of the plurality of antenna elements is different from the second number of the plurality of antenna elements or the first transmission power level is different from the second transmission power level.

The method further includes receiving the measurement report by receiving at least one of a RSRP, a RSRQ, a RSSI, a SINR, or a SNR from at least one UE. The method further includes receiving the measurement report by receiving a request to change at least one of the first number of the plurality of antenna elements at the base station or the first transmission power level at the base station. The method further includes determining, by the base station, the first number of the plurality of antenna elements based on at least one of a size of the antenna array, a coverage area for the antenna array, a codebook size, a latency, a phase calibration error, an amplitude calibration error, or a fraction of failed antenna elements. The method further includes determining, by the base station, the first transmission power level based on at least one of a size of the antenna array, a coverage area for the antenna array, a codebook size, a latency, a phase calibration error, an amplitude calibration error, or a fraction of failed antenna elements.

The method further includes determining, by the base station, the second number of the plurality of antenna elements based on a comparison between the measurement report and a threshold. The method further includes determining, by the base station, the second transmission power level based on a comparison between the measurement report and a threshold. In an example, the first number of the plurality of antenna elements is greater than the second number of the plurality of antenna elements, and the first transmission power level is less than the second transmission power level. In another example, the first number of the plurality of antenna elements is less than the second number of the plurality of antenna elements, and the first transmission power level is greater than the second transmission power level.

The method further includes transmitting the second communication signal by applying a codebook including beamforming weights. The method further includes adjusting, by the base station, the beamforming weights in the codebook based on the measurement report. The method further includes transmitting the first communication signal by transmitting the first communication signal to a UE via a transmission point remote from the BS, the transmission point including the antenna array.

Embodiments of the present disclosure further include a method of wireless communication, including receiving, by a user equipment from a base station, a first communication signal; transmitting, by the user equipment to the base station, a request to change at least one of an antenna array size at the base station or a transmit power level at the base station based on the first communication signal; and receiving, by the user equipment from the base station, a second communication signal in response to the request.

The method further includes receiving the first communication signal by receiving the first communication signal from a transmission point remote from the base station. The method further includes transmitting to the base station, a metric corresponding to a best beam pair at the user equipment, where the second communication signal is in response to the metric. The metric is at least one of a RSRP, a RSRQ, a RSSI, a SINR, a SNR corresponding to the best beam pair at the UE.

Embodiments of the present disclosure further include a method of wireless communication, including receiving, by a user equipment from a base station, a first communication signal; transmitting, by the user equipment to the base station, a first request to change an antenna array size at the base station based on the first communication signal; and receiving, by the user equipment from the base station, a second communication signal in response to the first request. In some aspects, the method may also include transmitting, by the user equipment to the base station, a second request to change a transmit power level at the base station based on the first communication signal, where receiving the second communication may be in response to the second request. In some aspects, the method may also include receiving, by the user equipment from the base station, a third communication signal; transmitting, by the user equipment to the base station, a second request to change a transmit power level at the base station based on the third communication signal; and receiving, by the user equipment from a base station, a fourth communication signal in response to the second request.

Embodiments of the present disclosure further include an apparatus including a transceiver configured to transmit, by a base station via an antenna array including a plurality of antenna elements, a first communication signal using a first number of the plurality of antenna elements and a first transmission power level; receive, by the base station from at least one user equipment, a measurement report based on the first communication signal; and transmit, by the base station, a second communication signal using a second number of the plurality of antenna elements and a second transmission power level based on the measurement report, where the at least one of the first number of the plurality of antenna elements is different from the second number of the plurality of antenna elements or the first transmission power level is different from the second transmission power level.

The transceiver is further configured to receive the measurement report by receiving at least one of a RSRP, a RSRQ, a RSSI, a SINR, or a SNR from at least one UE. The transceiver may be further configured to receive the measurement report by receiving a request to change at least one of the first number of the plurality of antenna elements at the base station or the first transmission power level at the base station.

The apparatus further includes a processor configured to determine the first number of the plurality of antenna elements based on at least one of a size of the antenna array, a coverage area for the antenna array, a codebook size, a latency, a phase calibration error, an amplitude calibration error, or a fraction of failed antenna elements. The processor is further configured to determine the first transmission power level based on at least one of a size of the antenna array, a coverage area for the antenna array, a codebook size, a latency, a phase calibration error, an amplitude calibration error, or a fraction of failed antenna elements.

The processor is further configured to determine the second number of the plurality of antenna elements based on a comparison between the measurement report and a threshold. The processor is further configured to determine the second transmission power level based on a comparison between the measurement report and a threshold. In an example, the first number of the plurality of antenna elements is greater than the second number of the plurality of antenna elements, and the first transmission power level is less than the second transmission power level. In another example, the first number of the plurality of antenna elements is less than the second number of the plurality of antenna elements, and the first transmission power level is greater than the second transmission power level.

The transceiver is further configured to transmit the second communication signal by applying a codebook including beamforming weights. The processor is further configured to adjust the beamforming weights in the codebook based on the measurement report. The transceiver is further configured to transmit the first communication signal by transmitting the first communication signal to a UE via a transmission point remote from the BS, the transmission point including the antenna array.

Embodiments of the present disclosure further include an apparatus including a transceiver configured to receive, by a user equipment from a base station, a first communication signal; transmit, by the user equipment to the base station, a request to change at least one of an antenna array size at the base station or a transmit power level at the base station based on the first communication signal; and receive, by the user equipment from the base station, a second communication signal in response to the request.

The transceiver is further configured to receive the first communication signal from a transmission point remote from the base station. The transceiver is further configured to transmit to the base station, a metric corresponding to a best beam pair at the user equipment, where the second communication signal is in response to the metric. The metric is at least one of a RSRP, a RSRQ, a RSSI, a SINR, a SNR corresponding to the best beam pair at the UE.

Embodiments of the present disclosure further include an apparatus including a transceiver configured to receive, by a user equipment from a base station, a first communication signal; transmit, by the user equipment to the base station, a first request to change a transmit power level at the base station based on the first communication signal; and receive, by the user equipment from the base station, a second communication signal in response to the first request. In some aspects, the transceiver is configured to receive, by the user equipment from the base station, a third communication signal; transmit, by the user equipment to the base station, a second request to change an antenna array size at the base station based on the third communication signal; and receive, by the user equipment from the base station, a fourth communication signal in response to the second request.

Embodiments of the present disclosure further include a computer-readable medium having program code recorded thereon, the program code including code for transmitting via an antenna array including a plurality of antenna elements, a first communication signal using a first number of the plurality of antenna elements and a first transmission power level; code for receiving from at least one user equipment, a measurement report based on the first communication signal; and code for transmitting a second communication signal using a second number of the plurality of antenna elements and a second transmission power level based on the measurement report, where the at least one of the first number of the plurality of antenna elements is different from the second number of the plurality of antenna elements or the first transmission power level is different from the second transmission power level.

The computer-readable medium further includes code for receiving at least one of a RSRP, a RSRQ, a RSSI, a SINR, or a SNR from at least one UE. The computer-readable medium further includes code for receiving a request to change at least one of the first number of the plurality of antenna elements at the base station or the first transmission power level at the base station. The computer-readable medium further includes code for determining, by the base station, the first number of the plurality of antenna elements based on at least one of a size of the antenna array, a coverage area for the antenna array, a codebook size, a latency, a phase calibration error, an amplitude calibration error, or a fraction of failed antenna elements. The computer-readable medium further includes code for determining, by the base station, the first transmission power level based on at least one of a size of the antenna array, a coverage area for the antenna array, a codebook size, a latency, a phase calibration error, an amplitude calibration error, or a fraction of failed antenna elements.

The computer-readable medium further includes code for determining, by the base station, the second number of the plurality of antenna elements based on a comparison between the measurement report and a threshold. The computer-readable medium further includes code for determining, by the base station, the second transmission power level based on a comparison between the measurement report and a threshold. In an example, the first number of the plurality of antenna elements is greater than the second number of the plurality of antenna elements, and the first transmission power level is less than the second transmission power level. In another example, the first number of the plurality of antenna elements is less than the second number of the plurality of antenna elements, and the first transmission power level is greater than the second transmission power level.

The computer-readable medium further includes code for transmitting the second communication signal by applying a codebook including beamforming weights. The computer-readable medium further includes code for adjusting, by the base station, the beamforming weights in the codebook based on the measurement report. The computer-readable medium further includes code for transmitting the first communication signal by transmitting the first communication signal to a UE via a transmission point remote from the BS, the transmission point including the antenna array.

Embodiments of the present disclosure further include a computer-readable medium having program code recorded thereon, the program code including code for receiving, by a user equipment from a base station, a first communication signal; code for transmitting, by the user equipment to the base station, a request to change at least one of an antenna array size at the base station or a transmit power level at the base station based on the first communication signal; and code for receiving, by the user equipment from the base station, a second communication signal in response to the request.

The computer-readable medium further includes code for receiving the first communication signal from a transmission point remote from the base station. The computer-readable medium further includes code for transmitting to the base station, a metric corresponding to a best beam pair at the user equipment, where the second communication signal is in response to the metric. The metric is at least one of a RSRP, a RSRQ, a RSSI, a SINR, a SNR corresponding to the best beam pair at the UE.

In an additional aspect of the disclosure, an apparatus includes means for transmitting (e.g., transceiver 410 or calibration module 408) a first communication signal using a first number of a plurality of antenna elements and a first transmission power level; means for receiving (e.g., transceiver 410 or report module 409), from at least one user equipment, a measurement report based on the first communication signal; and means for transmitting (e.g., transceiver 410 or calibration module 408) a second communication signal using a second number of the plurality of antenna elements and a second transmission power level based on the measurement report (e.g., feedback 230), where the at least one of the first number of the plurality of antenna elements is different from the second number of the plurality of antenna elements or the first transmission power level is different from the second transmission power level.

The apparatus further includes means for receiving (e.g., transceiver 410 or report module 409) at least one of a RSRP, a RSRQ, a RSSI, a SINR, or a SNR from at least one UE. The apparatus further includes means for receiving (e.g., transceiver 410 or report module 409) a request to change at least one of the first number of the plurality of antenna elements at the base station or the first transmission power level at the base station. The apparatus further includes means for determining (e.g., processor 402 or calibration module 408), by the base station, the first number of the plurality of antenna elements based on at least one of a size of the antenna array, a coverage area for the antenna array, a codebook size, a latency, a phase calibration error, an amplitude calibration error, or a fraction of failed antenna elements. The apparatus further includes means for determining (e.g., processor 402 or calibration module 408), by the base station, the first transmission power level based on at least one of a size of the antenna array, a coverage area for the antenna array, a codebook size, a latency, a phase calibration error, an amplitude calibration error, or a fraction of failed antenna elements.

The apparatus further includes means for determining (e.g., processor 402 or calibration module 408), by the base station, the second number of the plurality of antenna elements based on a comparison between the measurement report and a threshold. The apparatus further includes means for determining (e.g., processor 402 or calibration module 408), by the base station, the second transmission power level based on a comparison between the measurement report and a threshold. In an example, the first number of the plurality of antenna elements is greater than the second number of the plurality of antenna elements, and the first transmission power level is less than the second transmission power level. In another example, the first number of the plurality of antenna elements is less than the second number of the plurality of antenna elements, and the first transmission power level is greater than the second transmission power level.

The apparatus further includes means for transmitting (e.g., transceiver 410 or calibration module 408) the second communication signal by applying a codebook including beamforming weights. The apparatus further includes means for adjusting (e.g., processor 402 or calibration module 408), by the base station, the beamforming weights in the codebook based on the measurement report. The apparatus further includes means for transmitting (e.g., transceiver 410 or calibration module 408) the first communication signal by transmitting the first communication signal to a UE via a transmission point remote from the BS, the transmission point including the antenna array.

Embodiments of the present disclosure further include an apparatus including means for receiving (e.g., transceiver 510 or calibration module 508), from a base station, a first communication signal; means for transmitting (e.g., transceiver 510 or report module 509), by the user equipment to the base station, a request to change at least one of an antenna array size at the base station or a transmit power level at the base station based on the first communication signal; and means for receiving (e.g., transceiver 510 or calibration module 508), from the base station, a second communication signal in response to the request.

The apparatus further includes means for receiving (e.g., transceiver 510 or calibration module 508) the first communication signal from a transmission point remote from the base station. The apparatus further includes means for transmitting (e.g., transceiver 510 or report module 509) to the base station, a metric corresponding to a best beam pair at the user equipment, where the second communication signal is in response to the metric. The metric is at least one of a RSRP, a RSRQ, a RSSI, a SINR, a SNR corresponding to the best beam pair at the UE.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a base station (BS) via an antenna array including a plurality of antenna elements, a first communication signal using a first number of the plurality of antenna elements and a first transmission power level;
   receiving, by the BS from at least one user equipment (UE), one or more measurement reports based on the first communication signal; and
   transmitting, by the BS, a second communication signal using a second number of the plurality of antenna elements and a second transmission power level based on the one or more measurement reports, wherein at least one of the first number of the plurality of antenna elements is different from the second number of the plurality of antenna elements or the first transmission power level is different from the second transmission power level.

2. The method of claim 1, wherein the receiving, by the BS from at least one UE, a measurement report includes receiving a reference signal received power (RSRP), a reference signal received quality (RSRQ), a received signal strength indicator (RSSI), a signal-to-interference-plus-noise ratio (SINR), or a signal-to-noise ratio (SNR).

3. The method of claim 1, wherein the receiving, by the BS from at least one UE, a measurement report includes receiving a request to change at least one of the first number of the plurality of antenna elements at the BS or the first transmission power level at the BS.

4. The method of claim 1, further comprising:
   determining, by the BS, the first number of the plurality of antenna elements based on at least one of a size of the antenna array, a coverage area for the antenna array, a codebook size, a latency, a phase calibration error, an amplitude calibration error, or a fraction of failed antenna elements in the antenna array.

5. The method of claim 1, further comprising:
   determining, by the BS, the first transmission power level based on at least one of a size of the antenna array, a coverage area for the antenna array, a codebook size, a latency, a phase calibration error, an amplitude calibration error, or a fraction of failed antenna elements in the antenna array.

6. The method of claim 1, further comprising:
   determining, by the BS, the second number of the plurality of antenna elements based on a comparison between the one or more measurement reports and a threshold.

7. The method of claim 1, further comprising:
   determining, by the BS, the second transmission power level based on a comparison between the one or more measurement reports and a threshold.

8. The method of claim 1, wherein the first number of the plurality of antenna elements is greater than the second number of the plurality of antenna elements, and the first transmission power level is less than the second transmission power level.

9. The method of claim 1, wherein the first number of the plurality of antenna elements is less than the second number of the plurality of antenna elements, and the first transmission power level is greater than the second transmission power level.

10. The method of claim 1, wherein transmitting the second communication signal includes applying a codebook including beamforming weights.

11. The method of claim 10, further comprising:
adjusting, by the BS, the beamforming weights in the codebook based on the measurement report.

12. The method of claim 1, wherein transmitting the first communication signal includes transmitting the first communication signal to a UE via a transmission point remote from the BS, the transmission point including the antenna array.

13. The method of claim 1, wherein the receiving, by the BS from at least one UE, a measurement report includes receiving a plurality of measurement reports, the method further comprising:
aggregating the plurality of measurement reports; and
determining, based on the aggregated measurement reports, to transmit the second communication signal using the second number of the plurality of antenna elements and the second transmission power level.

14. The method of claim 1, further comprising:
determining to modify the number of plurality of antenna elements used for transmitting the second communication signal from the first number to the second number; and
determining to modify the transmission power level used for transmitting the second communication signal from the first transmission power level to the second transmission power level.

15. An apparatus comprising:
a transceiver configured to:
transmit, by a BS via an antenna array including a plurality of antenna elements, a first communication signal using a first number of the plurality of antenna elements and a first transmission power level;
receive, by the BS from at least one UE, one or more measurement reports based on the first communication signal; and
transmit, by the BS, a second communication signal using a second number of the plurality of antenna elements and a second transmission power level based on the one or more measurement reports, wherein at least one of the first number of the plurality of antenna elements is different from the second number of the plurality of antenna elements or the first transmission power level is different from the second transmission power level.

16. The apparatus of claim 15, wherein the measurement report includes at least one of a RSRP, a RSRQ, a RSSI, a SINR, a SNR from at least one UE.

17. The apparatus of claim 15, further comprising:
a processor configured to determine, by the BS, at one of the first number of the plurality of antenna elements or the first transmission power level based on at least one of a size of the antenna array, a coverage area for the antenna array, a codebook size, a latency, a phase calibration error, an amplitude calibration error, or a fraction of failed antenna elements in the antenna array.

18. The apparatus of claim 15, further comprising:
a processor configured to determine at least one of the second number of the plurality of antenna elements or the second transmission power level based on a comparison between the one or more measurement reports and a threshold.

19. The apparatus of claim 15, wherein the first number of the plurality of antenna elements is greater than the second number of the plurality of antenna elements, and the first transmission power level is less than the second transmission power level.

20. The apparatus of claim 15, wherein the first number of the plurality of antenna elements is less than the second number of the plurality of antenna elements, and the first transmission power level is greater than the second transmission power level.

21. The apparatus of claim 15, further comprising:
a processor configured to apply a codebook including beamforming weights.

22. The apparatus of claim 21, wherein the processor is configured to adjust the beamforming weights in the codebook based on the measurement report.

23. A method of wireless communication, comprising:
receiving, by a UE from a BS, a first communication signal;
transmitting, by the UE to the BS, a first request to change an antenna array size at the BS based on the first communication signal; and
receiving, by the UE from the BS, a second communication signal in response to the first request.

24. The method of claim 23, wherein receiving the first communication signal includes receiving the first communication signal from a transmission point remote from the BS.

25. The method of claim 23, further comprising:
transmitting, by the UE to the BS, a metric corresponding to a best beam pair at the UE, wherein the second communication signal is in response to the metric.

26. The method of claim 25, wherein the metric is at least one of a RSRP, a RSRQ, a RSSI, a SINR, a SNR corresponding to the best beam pair at the UE.

27. The method of claim 23, further comprising:
transmitting, by the UE to the BS, a second request to change a transmit power level at the BS based on the first communication signal, wherein the receiving a second communication is in response to the second request.

28. The method of claim 23, further comprising:
receiving, by the UE from the BS, a third communication signal;
transmitting, by the UE to the BS, a second request to change a transmit power level at the BS based on the third communication signal; and
receiving, by the UE from the BS, a fourth communication signal in response to the second request.

29. An apparatus comprising:
a transceiver configured to:
receive, by a UE from a BS, a first communication signal;
transmit, by the UE to the BS, a first request to change a transmit power level at the BS based on the first communication signal; and
receive, by the UE from the BS, a second communication signal in response to the first request.

30. The apparatus of claim 29, wherein the transceiver is configured to:
- receive, by the UE from the BS, a third communication signal;
- transmit, by the UE to the BS, a third request to change an antenna array size at the BS based on the third communication signal; and
- receive, by the UE from the BS, a fourth communication signal in response to the third request.

* * * * *